(12) United States Patent
Bronson et al.

(10) Patent No.: US 7,687,729 B2
(45) Date of Patent: Mar. 30, 2010

(54) PROCESSED BOLT END USEFUL IN A TURN SIGNAL SWITCH ASSEMBLY

(75) Inventors: Walter F. Bronson, Madison, IN (US); Karan Dua, Madison, IN (US); James L. Townsend, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 25 days.

(21) Appl. No.: 11/775,501

(22) Filed: Jul. 10, 2007

(65) Prior Publication Data
US 2009/0014293 A1    Jan. 15, 2009

(51) Int. Cl.
*H01H 3/16*    (2006.01)
(52) U.S. Cl. .................. 200/61.27; 200/61.54
(58) Field of Classification Search ........... 200/61.27
See application file for complete search history.

(56) References Cited

U.S. PATENT DOCUMENTS

| | | | | |
|---|---|---|---|---|
| 2,312,942 A * | 3/1943 | Ulinski | ......... | 180/443 |
| 5,003,139 A * | 3/1991 | Edds et al. | ......... | 200/401 |
| 5,390,956 A * | 2/1995 | Thomas | ......... | 280/777 |
| 5,496,978 A * | 3/1996 | Umezawa et al. | ......... | 200/61.3 |
| 5,498,032 A * | 3/1996 | Thomas | ......... | 280/777 |
| 5,509,325 A * | 4/1996 | Thomas | ......... | 74/493 |
| 5,722,706 A * | 3/1998 | Bartel et al. | ......... | 292/216 |
| 5,977,494 A * | 11/1999 | Sano et al. | ......... | 200/61.54 |
| 6,948,583 B2 * | 9/2005 | Mazzucchi et al. | ......... | 180/315 |
| 2003/0021628 A1 * | 1/2003 | Gudaitis et al. | ......... | 403/408.1 |

* cited by examiner

*Primary Examiner*—Michael A Friedhofer
*Assistant Examiner*—Lheiren Mae A Caroc
(74) *Attorney, Agent, or Firm*—Woodard, Emhardt, Moriarty, McNett & Henry LLP

(57) ABSTRACT

A turn signal switch assembly is constructed having a switch stalk and junction box rotatably coupled using a shoulder bolt. The shoulder bolt has a shoulder area useful for allowing the switch stalk to rotate freely relative to the junction box. The threaded end of the shoulder bolt is turned and tightened into at least one corresponding threaded aperture in the junction box, thereby mechanically coupling the switch stalk to the junction box. The threaded end of the shoulder bolt also extends past a surface of the junction box so that the threaded end is exposed. The threaded end is mechanically transformed by an orbital riveting device so as to act as a positive locking feature. The shoulder bolt thereafter secures the switch stalk to the junction box using the mechanical advantages of a threaded connection in combination with the positive locking feature of a riveted connection.

12 Claims, 5 Drawing Sheets

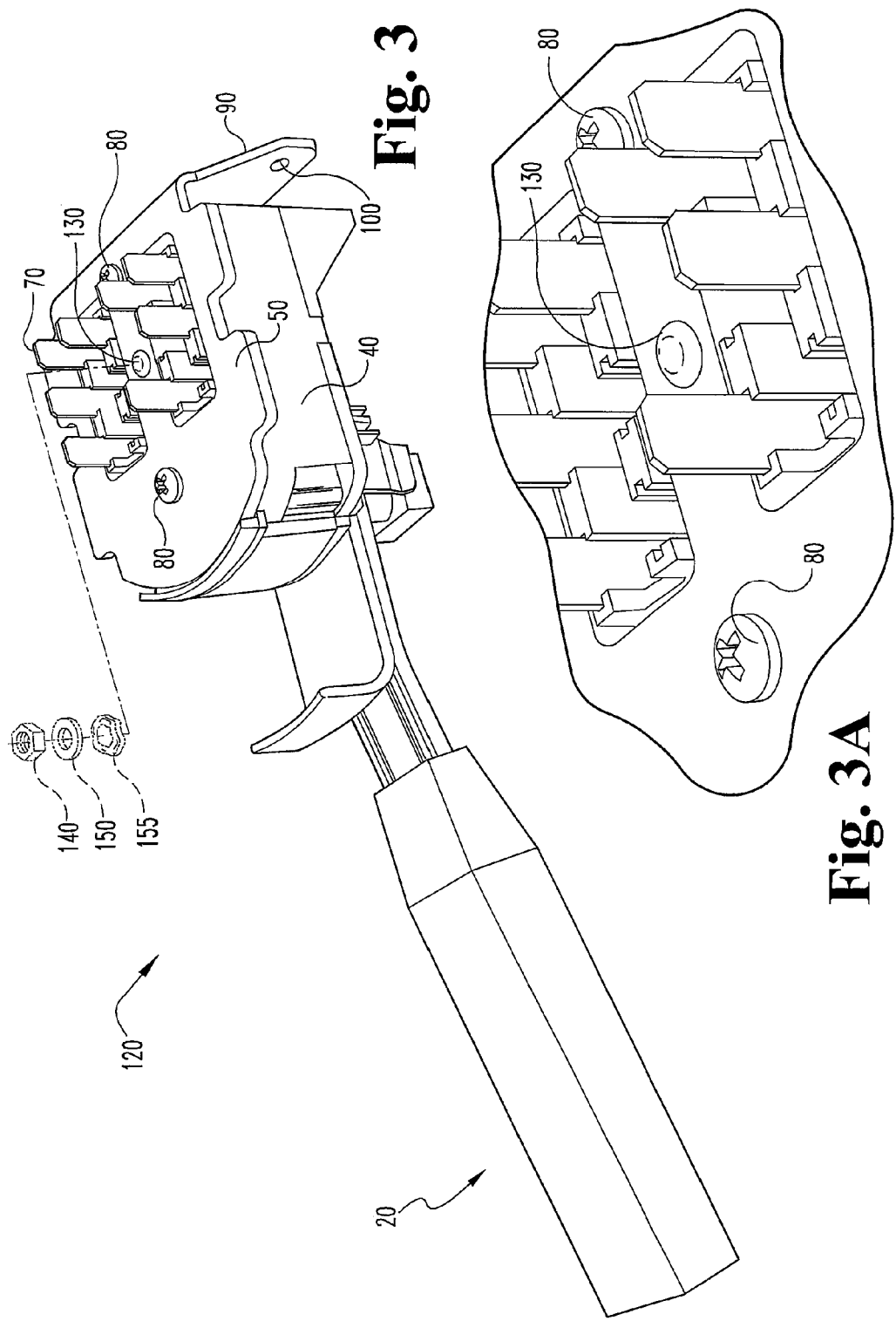

PROCESSED BOLT END USEFUL IN A TURN SIGNAL SWITCH ASSEMBLY

TECHNICAL FIELD

Apparatus, methods and devices for coupling rotating parts involved in an automotive steering assembly, particularly, but not exclusively, with respect to the turn signal switch assembly.

BACKGROUND

In almost every motor vehicle a lighted turn signal is used to indicate a change in direction of the vehicle, such as when rounding a street corner. The lighted turn signal is a brightly illuminated exterior light that is activated by a driver from the interior of the vehicle. Usually, the steering column of the vehicle includes a turn signal switch that is used to activate the lighted turn signal. The turn signal switch includes a stalk which pivots in a vertical plane and is positioned to allow easy manipulation by the operator. The stalk can be pivoted to an upper or lower detent position thereby actuating the lighted turn signal on the vehicle.

Turn signal switches are often composed of many different parts and can be made from many different types of materials. The parts that compose a turn signal switch assembly, furthermore, are normally connected together using screws and bolts.

Turn signal switch assemblies can be subject to vibrations of varying intensities and durations which, in some cases, may impact the integrity of the assemblies. As such, the assemblies are usually designed and manufactured to resist such vibrations and it is intended that the life of the turn signal switch assembly is at least the same as the life of the motor vehicle. Because vibrations may cause the screws and bolts to loosen and back out, adhesive compounds such as LOCTITE can sometimes be applied to their threads. These adhesive compounds, however, merely discourage loosening caused by vibrations; the compounds do not prohibit loosening.

What is needed, therefore, is a better method of ensuring reliable attachment of parts in turn signal switch assemblies.

SUMMARY

A turn signal switch assembly is constructed having a switch stalk and junction box rotatably coupled using a shoulder bolt. The shoulder bolt has a shoulder area useful for allowing the switch stalk to rotate freely relative to the junction box. The threaded end of the shoulder bolt is turned and tightened into at least one corresponding threaded aperture in the junction box, thereby mechanically coupling the switch stalk to the junction box. The threaded end of the shoulder bolt also extends past a surface of the junction box so that the threaded end is exposed. The threaded end is mechanically transformed by an orbital riveting device so as to act as a positive locking feature. The shoulder bolt thereafter secures the switch stalk to the junction box using the mechanical advantages of a threaded connection in combination with the positive locking feature of a riveted connection.

In one embodiment, an assembly for use with steering columns in vehicles is disclosed, the assembly comprising a turn signal switch junction box having a threaded aperture; and a bolt having a threaded end coupled to the threaded aperture of the turn signal switch junction box, the bolt also having a orbital riveted end.

In another embodiment, an assembly for use with steering columns in vehicles is disclosed, the assembly comprising a shoulder bolt having a bolt head, a threaded portion and an orbital rivet end; a turn signal switch junction box having a first junction box aperture and a second junction box aperture, both first junction box aperture and second junction box aperture configured to receive the threaded end of the shoulder bolt, both the first junction box aperture and the second junction box aperture sized to prevent the passage of the bolt head, the second junction box aperture having a threaded surface configured to cooperate with the threaded portion of the shoulder bolt; and a turn signal switch stalk coupled to the turn signal switch junction box.

In another embodiment, a method for ensuring the connection of a turn signal switch to a junction box is disclosed, the method comprising the steps of (a) providing a junction box, a turn signal switch stalk, and a shoulder bolt, the shoulder bolt having a threaded end; (b) pivotally fastening the turn signal switch stalk to the junction box with the shoulder bolt, wherein the threaded end of the shoulder bolt is exposed; and (c) orbital riveting the threaded end of the shoulder bolt.

BRIEF DESCRIPTION OF THE DRAWINGS

FIG. 3 is perspective view of a new turn signal switch assembly according to an example embodiment.

FIG. 3A is an enlarged view of a section of the new turn signal switch assembly illustrated in FIG. 3.

DETAILED DESCRIPTION

Figure 1:
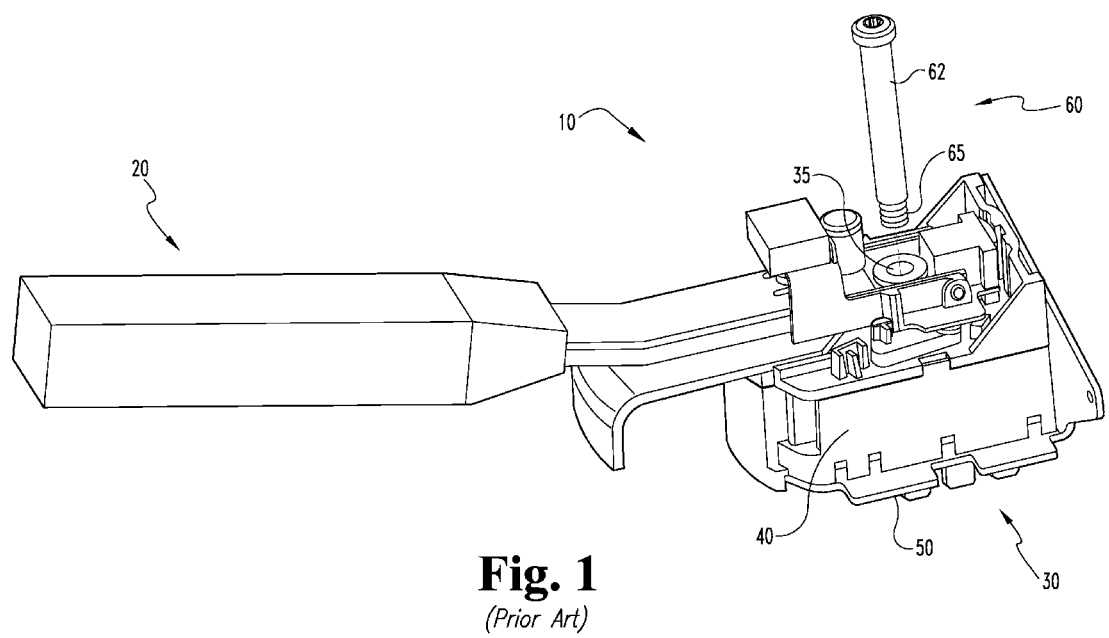
FIG. 1 is a top perspective view of a prior art turn signal switch assembly.

For the purposes of promoting an understanding of the principles the present invention, reference will now be made to the preferred embodiments illustrated in the drawings and specific language will be used to describe the same. It will nevertheless be understood that no limitation on the scope of the present invention is intended, and that any alterations or modifications in the disclosed embodiments and any further applications of the present invention are contemplated as would normally occur to one skilled in the art to which the present invention relates.

A turn signal switch assembly is used to indicate turn signals on a motor vehicle. Prior art turn signal switch assemblies include a switch stalk pivotally connected to a junction box through the use of a shoulder bolt. The shoulder bolt is a special kind of bolt that provides a relatively smooth surface, called the shoulder, on which other mechanical parts can rotate. In this case, the shoulder bolt provides a smooth surface on which the switch stalk can rotate. In order to better illustrate the apparatus and methods, specific reference will now be made to exemplary illustrated embodiments.

FIG. 1 illustrates a prior art turn signal switch assembly 10 that is composed of two main parts: switch stalk 20 which allows the user to grasp and move the switch; and junction box 30 that connects turn signal switch assembly 10 to the steering column of the vehicle (not shown). Shoulder bolt 60 is used to connect the two main parts. Shoulder bolt 60 is shown in FIG. 1 prior to being received by junction box 30. When installed, shoulder bolt 60 is inserted into first aperture 35 and tightened snugly into junction box 30, thereafter remaining fixed relative to junction box 30. Shoulder 62 of shoulder bolt 60 provides a relatively smooth surface on which switch stalk 20 can rotate.

As will be understood, switch stalk 20 can be formed of a plastic or other material and can move in a variety of directions. Switch stalk 20 is capable of moving clockwise or counterclockwise (with respect to a steering column on which the assembly is mounted) to cause a right turn or left turn indication, respectively, to be made. In other movements, switch stalk 20 can move up or down to transition the headlamps from a low-beam configuration to a high-beam configuration. Switch stalk 20 can have any variety of additional functional features integrated into the stalk, such as, but not limited to, wiper selection, horn, headlamp and cruise control settings.

Junction box 30 includes, among other things, housing 40 and adapter 50. Housing 40 is used to contain electrical and/or mechanical components that enable certain movements of the stalk, and activation of certain features, to be transmitted to specific devices on the vehicle. For example, housing 40 may provide necessary electrical circuit pathways that connect the wiper selection switch to the windshield wiper motors (not shown). Housing 40 can be made out of metal or a suitable synthetic material and can have any variety of shapes and sizes necessary to house the electrical and/or mechanical components. For example, if switch stalk 20 performs only a turn signal function, then housing 40 may be relatively small; conversely, housing 40 may be relatively large if switch stalk 20 performs a multitude of functions. Housing 40 may also be adapted to be integrated within a steering column of a motor vehicle. If certain constraints dictate a small steering column, such as passenger vehicle compartment size, firewall configuration, or engine compartment configuration, then housing 40 may be appropriately designed to accommodate such constraints.

Adapter 50 is connected to housing 40 and allows for turn signal switch assembly 10 to be mounted to a steering column. Adapter 50 can be made of any suitable material such as steel or synthetic materials, to name just a few. Adapter 50 is designed to cooperatively attach housing 40 to a steering column (not shown).

Figures 2, 2A:
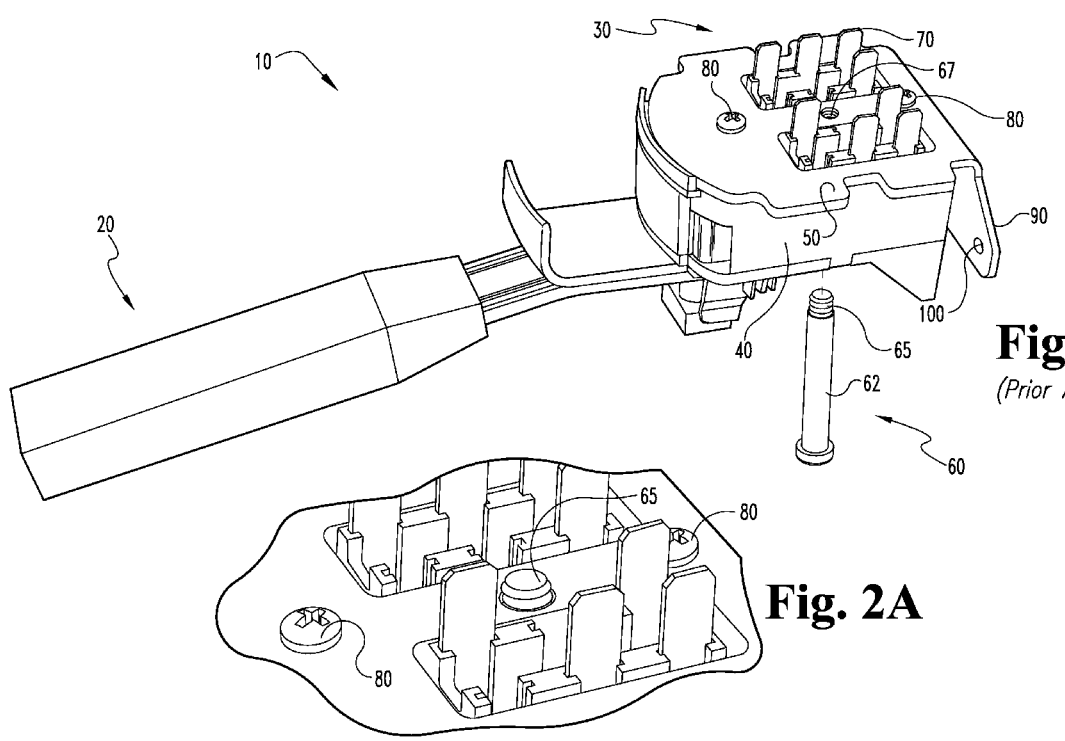
FIG. 2 is a bottom perspective view of the prior art turn signal switch assembly illustrated in FIG. 1.
FIG. 2A is a bottom perspective view of the prior art turn signal switch assembly illustrated in FIG. 1.
Figures 4, 5, 6, 7, 8:
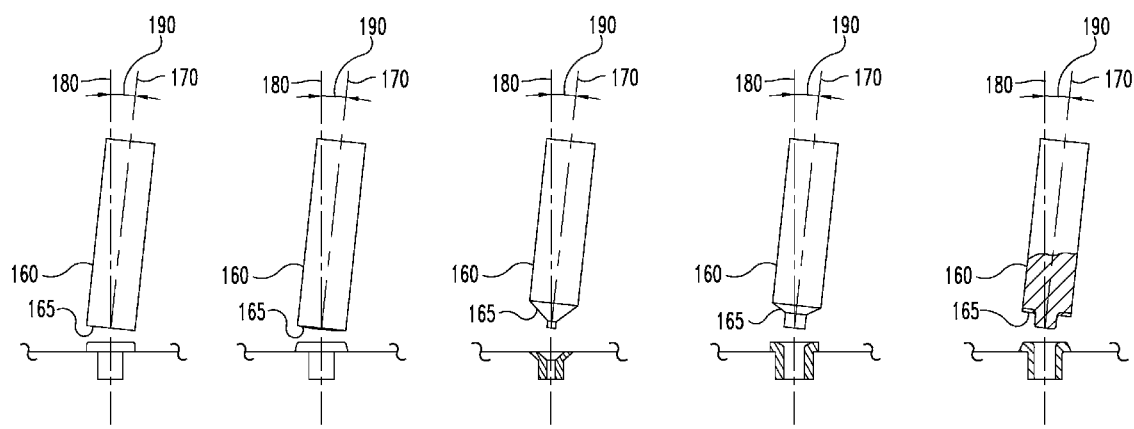
FIG. 4 is side view of one embodiment of an orbital riveted end in proximity to an orbital tool.
FIG. 5 is side view of one embodiment of an orbital riveted end in proximity to an orbital tool.
FIG. 6 is side view of one embodiment of an orbital riveted end in proximity to an orbital tool.
FIG. 7 is side view of one embodiment of an orbital riveted end in proximity to an orbital tool.
FIG. 8 is side view of one embodiment of an orbital riveted end in proximity to an orbital tool.
Figure 9:
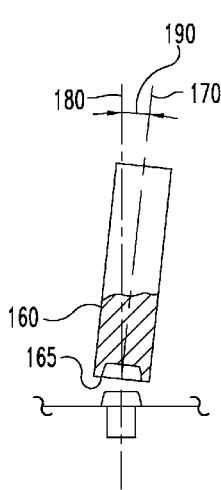
FIG. 9 is side view of one embodiment of an orbital riveted end in proximity to an orbital tool.
Figure 10:
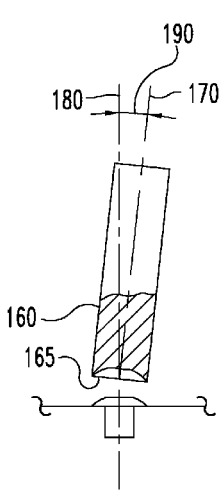
FIG. 10 is side view of one embodiment of an orbital riveted end in proximity to an orbital tool.
Figure 12:
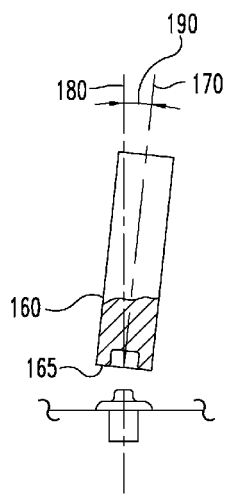
FIG. 12 is side view of one embodiment of an orbital riveted end in proximity to an orbital tool.
Figure 11:
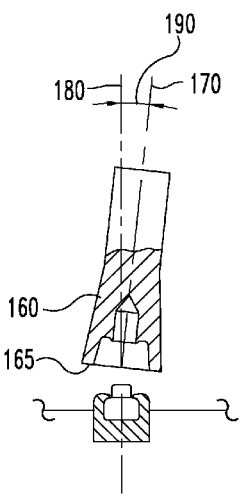
FIG. 11 is side view of one embodiment of an orbital riveted end in proximity to an orbital tool.

FIGS. 2 and 2A illustrate the opposite side of the embodiment shown in FIG. 1 before and after shoulder bolt 60 is inserted. When installed, threaded end 65 of shoulder bolt 60 is received by corresponding threaded aperture 67 of junction box 30.

Adapter 50 is shown attached to housing 40 using screws 80. As mentioned above, adapter 50 is used to connect junction box 30 to the steering column (not shown). Adapter 50 includes flanges 90 in the illustrated embodiment which are located on either side of junction box 30. Each flange 90 includes two apertures 100 each useful for receiving a fastener that secures turn signal switch assembly 10 to the steering column. Flange 90 is capable of receiving fasteners such as, but not limited to, screws, bolts, and pins.

Threaded end 65 of shoulder bolt 60 can be seen protruding from a surface of adapter 50. Threaded end 65 is shown without a nut affixed, but the threads of shoulder bolt 60 can have an adhesive compound such as LOCTITE applied prior to securing a nut and optional washer.

FIGS. 3 and 3A depicts a new turn signal switch assembly 120 of an illustrated embodiment; FIG. 3A merely depicts an enlarged section of new turn signal switch assembly 120 of FIG. 3. Note that many elements of the assembly in FIG. 3 appear the same as in FIG. 2, but that the threaded end of shoulder bolt 60 in FIGS. 3 and 3A has been processed with an orbital riveter and has thereby been reshaped, or transformed, into orbital rivet end 130 using a cold-forming process.

In some embodiments, nut 140 may be fastened to the end of the shoulder bolt wherein nut 140 and threaded end of shoulder bolt 60 (not shown) may together be transformed into orbital rivet end 130. Likewise, some embodiments may include washer 150 and nut 140 that may also be transformed to create orbital rivet end 130. In still other embodiments, washer 150 may be placed onto threaded end 65 of shoulder bolt 60, but without nut 140, after which threaded end 65 of shoulder bolt 60 may still be transformed. In this embodiment washer 150 may, or may not, be involved in the transformation. In some embodiments, adhesive 155 may be applied to threaded end 65, or nut 140 may be tightened to threaded end 65 of shoulder bolt 60, to further ensure the threaded connection.

Normally, bolted connections and riveted connections may be considered to be mutually exclusive in that either a rivet or bolt are used. As a person might recognize, one fastening approach might be preferred over another in any given application. For example, rivets can offer some cost savings relative to bolts if that is a factor in deciding which fastening approach to use. In particular, rivets can be inexpensive to manufacture owing in part to a smooth shank; bolts, on the other hand, typically start with a smooth shank but must thereafter be processed to develop a threaded surface on which the bolt can act.

In addition to their relative cost, rivets can also be relatively simple to install. For example, an impact rivet can be used as a fastener by placing the rivet into an aperture, locating a bucking bar in proximity to one end of the rivet, and applying an impact force to the other. When used, the entire end of the smooth shank is deformed past its material yield point under sufficiently high loading conditions to provide some type of positive locking feature. A typical bolt, on the other hand, employs the mechanically advantageous use of male threads that are cooperatively engaged by corresponding threads in a female connection, but require the bolt to be turned a number of times before it is fastened. Even so, for all the benefits of impact rivets, bolts offer the ability to be installed as a fastener at a predetermined torque setting. Impact rivets, in contrast, offer no such ability.

The approach developed and as disclosed herein, combines the mechanically advantageous threaded connection that a bolt provides in conjunction with the positive locking features of a rivet, wherein after the bolt is tightened to desired torque levels, the entire end of the bolt is deformed past its material yield point under sufficiently high loading conditions using orbital riveting techniques.

Orbital riveting the threaded end of a shoulder bolt used in the turn signal switch assembly offers many advantages that are not possible when using conventional bolted connections or conventional riveted connections alone. For example, a bolted connection by itself may be predisposed to loosen when the connection is subject to vibrations. To prevent such loosening, the threaded end can be riveted using an orbital riveting as discussed above thus providing a positive locking feature that is not available when using conventional bolted connections. Orbital riveting provides for a reduction in the forces required to rivet the turn signal switch together (in this case a shoulder bolt), sometimes by as much as 80% relative to an impact riveter. Fine control of forces is also possible which permit tight tolerance control and precise shaping of the orbital rivet head. In this way the shoulder bolt can be tightened to a desired torque level and then precisely riveted into place. Orbital riveting can be especially useful in the turn signal switch assembly because the turn signal switch assembly is an application that requires the connection of rotating mechanical parts where the parts must be positively fastened but cannot have either excessive friction between the parts, or excessive play. As mentioned above, the forces that orbital riveting imparts on a rivet workpiece (whether it is a conventional rivet or, as in the instant application, a threaded bolt), may be so substantially less so as to mitigate deformations and/or expansions of the workpiece that, in impact riveting at least, may seriously impede the rotational capabilities of the rotating parts.

FIGS. 4-12 depict a variety of forms that orbital rivet end 130 may take. Shown in the figures are a number of orbital rivet tools having a variety of orbital rivet ends. FIGS. 4-12 depict, respectively, the following shapes: flat standard, conical, flare, shoulder, eyelet, captured flat, crown, swaging, and hollow. Each shape can be selected depending on the type of application envisioned for the riveted assembly. The shape may also be selected based upon the proximity of the rivet shape to other structures and/or devices.

The cold-forming process depicted in FIGS. 4-12 uses orbital tool 160 having an end face 165 that is generally perpendicular to longitudinal axis 170, which itself is offset from rotational axis 180 by a fixed, small angle 190. Orbital tool 160 is rotated about a point of rotation located at the intersection of longitudinal axis 170 and rotational axis 180. When a riveted connection is desired, end face 165 of the tool is placed into pressured contact with threaded end 65 of shoulder bolt 60 (including nut 140 and washer 150, if fitted). The orbital tool 160 is then rotated about the rotational axis 170 whereby the rotation of the end face causes the material of shoulder bolt 60 (including nut 140 and washer 150, if fitted) to move, resulting in a progressive deformation and transformation of the end of the shoulder bolt 60 into a predetermined shape.

While the invention has been illustrated and described in detail in the drawings and foregoing description, the same is to be considered as illustrative and not restrictive in character, it being understood that only the preferred embodiments have been shown and described, and that all changes, equivalents, and modifications that come within the spirit of the invention defined by the claims are desired to be protected.

What is claimed is:

1. An assembly for use with steering columns in vehicles, the assembly comprising:
   a turn signal switch junction box having a threaded aperture formed therein;
   a bolt having a threaded end threadingly engaged with the threaded aperture of the turn signal switch junction box; and
   a nut mated to the threaded end of the bolt;
   wherein the bolt threaded end includes an orbital rivet end formed thereon, the nut forming part of the orbital rivet end.

2. The assembly of claim 1, wherein the bolt is a shoulder bolt.

3. The assembly of claim 2, further comprising a stalk, wherein the shoulder of the shoulder bolt provides a pivoting surface on which the stalk is capable of rotating about the turn signal switch housing.

4. The assembly of claim 1, wherein the orbital rivet end is selected from the group consisting of: flat standard, conical, flare, shoulder, eyelet, captured flat, crown, swaging, and hollow.

5. The assembly of claim 1 further comprising a washer mated to the shoulder bolt, wherein the washer forms part of the orbital rivet end.

6. An assembly for use with steering columns in vehicles, the assembly comprising:
   a shoulder bolt having a bolt head, a threaded portion and an orbital rivet end;
   a turn signal switch junction box having a first junction box aperture and a second junction box aperture, both first junction box aperture and second junction box aperture configured to receive the threaded end of the shoulder bolt, both the first junction box aperture and the second junction box aperture sized to prevent the passage of the bolt head, the second junction box aperture having a threaded surface configured to cooperate with the threaded portion of the shoulder bolt;
   a turn signal switch stalk coupled to the turn signal switch junction box; and
   a nut mated to the shoulder bolt, wherein the nut forms part of the orbital rivet end.

7. The assembly of claim 6, further comprising an adhesive, the adhesive applied to the threads of the shoulder bolt.

8. The assembly according to claim 6, wherein the orbital rivet end of the shoulder bolt is a configuration selected from the group consisting of: flat standard, conical, flare, shoulder, eyelet, captured flat, crown, swaging, and hollow.

9. The assembly of claim 6 further comprising a washer mated to the shoulder bolt, wherein the washer forms part of the orbital rivet end.

10. A method for ensuring the connection of a turn signal switch to a junction box, the method comprising the steps of:
    (a) providing a junction box, a turn signal switch stalk, a shoulder bolt, and a nut mated to the shoulder bolt, the shoulder bolt having a threaded end;
    (b) pivotally fastening the turn signal switch stalk to the junction box with the shoulder bolt, wherein at least a portion of the threaded end of the shoulder bolt is exposed; and
    (c) orbital riveting the threaded end of the shoulder bolt, wherein the nut forms part of the orbital rivet configuration.

11. The method of claim 10, wherein step (c) results in the shoulder bolt being reshaped into an orbital rivet configuration selected from the group consisting of: flat standard, conical, flare, shoulder, eyelet, captured flat, crown, swaging, and hollow.

12. The method of claim 10 wherein step (a) further comprises providing a washer mated to the shoulder bolt, wherein the washer forms part of the orbital rivet configuration.

* * * * *